(No Model.) 2 Sheets—Sheet 1.

J. H. NEWELL.
CHAIN PIPE WRENCH.

No. 526,047. Patented Sept. 18, 1894.

Witnesses
T. A. Conner
Geo. M. Whitney

Inventor
John Hoitt Newell
by _____, Attorney.

(No Model.) 2 Sheets—Sheet 2.

J. H. NEWELL.
CHAIN PIPE WRENCH.

No. 526,047. Patented Sept. 18, 1894.

Witnesses

Inventor
John Hoitt Newell
Attorney.

UNITED STATES PATENT OFFICE.

JOHN H. NEWELL, OF HURLEY, WISCONSIN.

CHAIN PIPE-WRENCH.

SPECIFICATION forming part of Letters Patent No. 526,047, dated September 18, 1894.

Application filed January 19, 1894. Serial No. 497,362. (No model.)

*To all whom it may concern:*

Be it known that I, JOHN HOITT NEWELL, a citizen of the United States of America, and a resident of Hurley, in the State of Wisconsin, have invented a new and useful Improvement in Chain Pipe-Wrenches, of which the following is a specification.

This invention relates to what are known as chain-tongs or chain pipe-wrenches in which a chain or flexible band is attached at both ends to what is herein termed the foot of a hand-lever; an adjusting device or "take-up" being interposed between one end of the chain or band and the lever to provide for tightening the chain or band upon pipes or rods of different sizes. A chain is ordinarily used; a suitable flexible band being substituted, in connection with a cushion of leather or the like under the heel of the lever, to adapt the wrench for screwing and unscrewing pipes and rods of polished metal; and such tools are almost exclusively employed for manipulating pipes and cylindrical pipe-couplings or sleeves. The term "chain" will be used in this specification as meaning a chain or band, and the term "pipe" as meaning a pipe pipe-coupling or rod.

The present invention consists in certain novel combinations of parts, hereinafter set forth and claimed, whereby adjusting the chain is facilitated, lateral or torsional strain on the take-up is prevented, friction on the pipe during the reverse movements of the hand-lever is reduced, and a given size of wrench is adapted for a larger range of work than heretofore; while the improved wrench is rendered simpler and of superior strength, as compared with previous wrenches of like weight.

Two sheets of drawings accompany this specification as part thereof.

Figure 1:
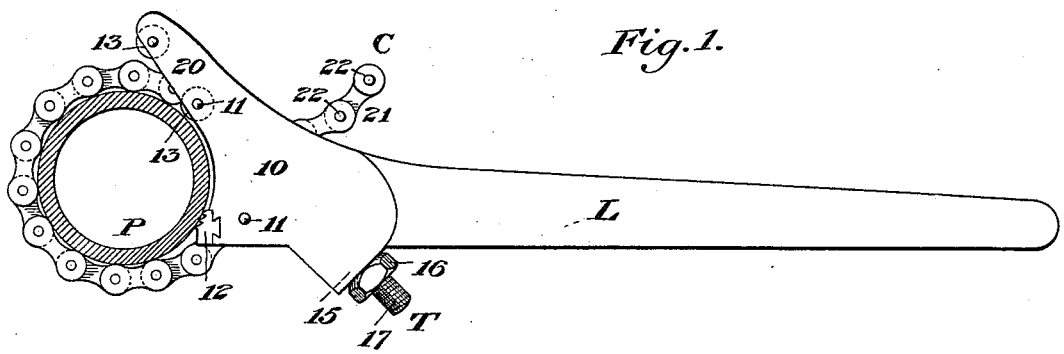
Figure 2:
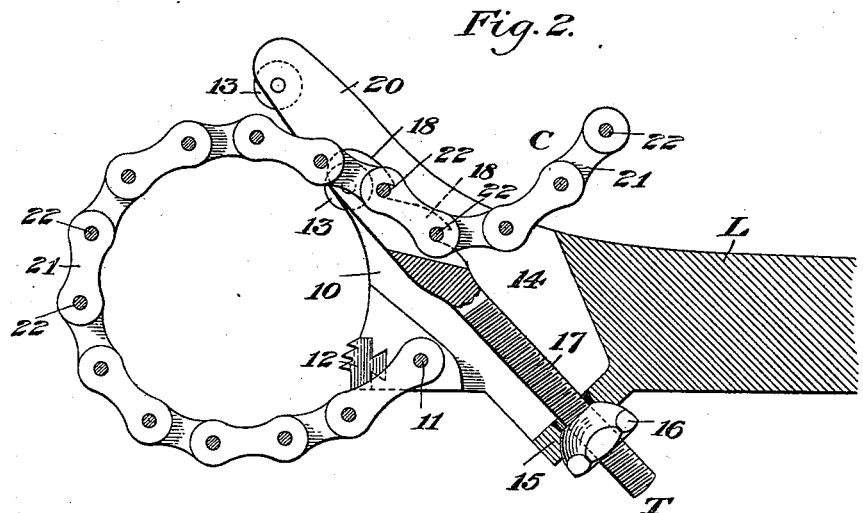
Figure 3:
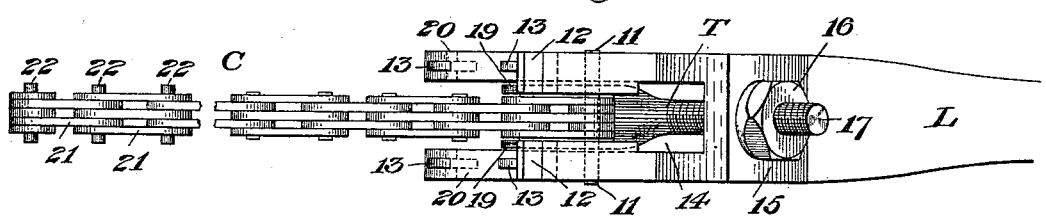
Figure 4:
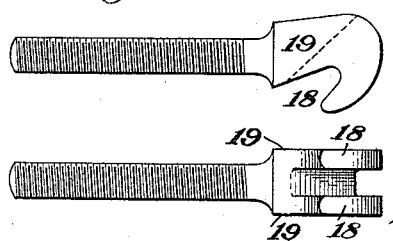
Figure 6:
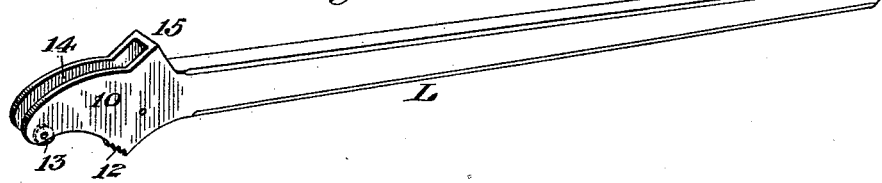
Figure 5:
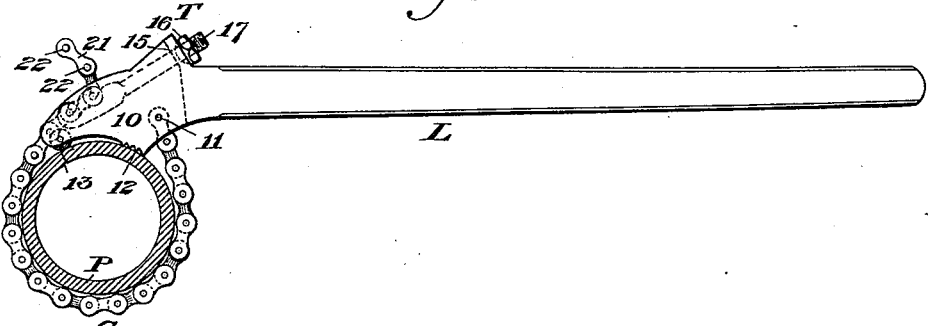
Figure 7:
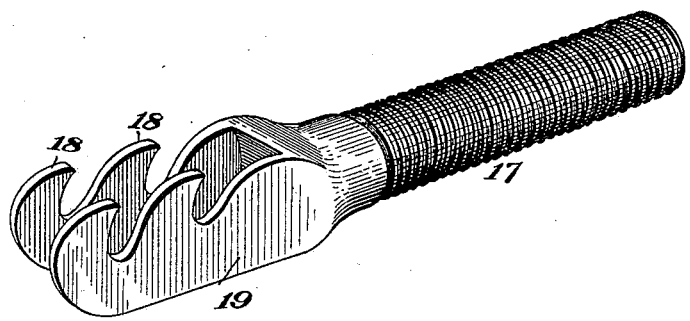
Figure 8:
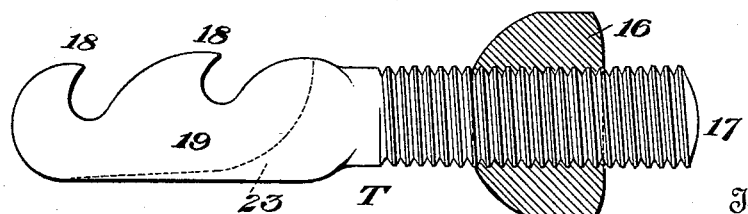

Figure 1 of the drawings is a small scale elevation of an improved pipe-wrench in connection with a cross-section of a pipe, illustrating the operation of the wrench. Fig. 2 is an enlarged sectional view of the chain end of the wrench. Fig. 3 is an edge view projected from Fig. 2. Fig. 4 represents two elevations of a substitute take-up bolt. Fig. 5 is a view similar to Fig. 1 of a modified wrench. Fig. 6 is a perspective view of the lever of said modified wrench. Fig. 7 is a perspective view of its take-up bolt; and Fig. 8 is an elevation of the latter, and a section of its take-up nut.

Like letters and numbers refer to like parts in all the figures.

In either form of the improved wrench, a hand-lever L, constructed with a peculiarly shaped foot 10, is combined with a chain C, fixedly attached thereto at one end by a pin 11, and with a peculiarly constructed take-up, T, to attach the other end of the chain, and to provide for tightening or adjusting the chain as above. A pipe P is shown in cross-section in Figs. 1 and 5 to illustrate the operation. In both forms of the lever L, the heel of the foot is provided with biting devices 12 in the form of the customary "fluting" to bite the pipe during each main stroke of the lever, or each downward stroke as the wrench is shown in Fig. 1. This fluting may in practice either be formed by or upon renewable steel heel-pieces, as in Figs. 1, 2 and 3, or by or upon the metal of which the lever is formed, as indicated in Figs. 5 and 6. The toe of the lever in both forms is provided with antifriction devices in the form of rollers 13, which roll upon the pipe during the reverse movements of the lever, indicated by the arrow *b* Fig. 1.

The lever is also provided in both forms with a longitudinal recess 14, having parallel sides perpendicular to the sole of its foot, which bifurcates the foot of the lever, and accommodates within it both ends of the chain C, together with the hook-end of the take-up T, and with a seat 15 for the take-up nut 16; said seat having in each case a spheric concavity, and said nut a spheric back fitted to said concavity. A bolt 17, having at one end the ordinary form of a screw-bolt, fitted to the nut 16, completes the take-up. The other end of said bolt 17 forms what has been termed the hook-end of the take-up, having a recessed enlargement provided with one or more pairs of hooks 18 to engage with the free end of the chain C. This end of the take-up bolt has also parallel sides 19 to coact with the parallel sides of the recess 14 for keeping the bolt from turning. It is adjusted by turning the nut 16 with the fingers, the object being to tighten the chain sufficiently to limit lost motion to a minimum, without preventing sufficient play to clear the fluting 12 when the stroke of the lever is reversed. The semi-spheric shape of the nut 16 and its spheric seat adapt the bolt 17 to adjust itself to the line of strain, so that there shall always be a direct pull on the nut 16, whatever the diameter of the pipe may be, and insures a uniform support of the nut in the direction of strain in all positions of the take-up.

In the specific wrench represented by Figs. 1, 2 and 3, the foot of the lever has an extended toe 20, tangential with reference to the concavity adjacent to said fluting 12 and two pairs of antifriction rollers 13, to adapt the wrench to pipes of two ranges of sizes, so to speak; that is to say the wrench is adapted to be used as in Fig. 1 on pipes of a given size or thereabout, while with larger sizes its toe-extension 20 comes into service, and facilitates the operation. In this specific construction, moreover, the chain C is composed of edge-opposing flat links 21, and transverse pintles 22, as best seen in Fig. 3, which construction is preferred, and the ends of a sufficient number of pintles at the free end of the chain project so as to engage with said hooks 18 of the take-up as in Fig. 2. Finally, as regards said specific wrench, Figs. 1, 2 and 3, its take-up T is not only fitted to said preferred chain, but its nut-seat 15 is located at what is known as the back of the wrench, and the bolt extends diagonally across the longitudinal axis of the lever to engage with the chain. See Fig. 3.

In the modified wrench represented by Figs. 5 to 8 inclusive, the nut-seat 15 for the take-up is located at what is known as the front of the lever. The hook-end of the take-up bolt has a closed back 23, Fig. 8, to strengthen it; and the wrench is by way of illustration confined to one range of sizes, or in other words is constructed without said toe-extension 20 of the wrench first described. Otherwise the wrenches are in all material respects alike, including the chain C.

As illustrated by Fig. 4, the take-up bolt 17 may instead be adapted to coact with the more common "cable" chain by engaging with successive links, its hooks 18 being constructed with reference thereto as indicated in the figure. The anti-friction rollers 13 may moreover be wholly omitted for some classes of work; and other like modifications will suggest themselves to those skilled in the art.

Having thus described the said improvement, I claim as my invention and desire to patent under this specification—

1. In a chain pipe-wrench, the combination with the hand-lever and chain of a take-up composed of a non-rotary bolt having a hook-end to engage with one end of the chain and a rotary nut fitted to the screw-end of said bolt and having a spheric back, said lever having a spheric seat for said nut, substantially as hereinbefore specified.

2. In a chain pipe-wrench, a hand-lever having biting devices at its heel, a toe to engage the pipe during the reverse strokes of the lever, a take-up seat having a spheric concavity, and a longitudinal recess having parallel sides, in combination with a chain one end of which is attached to said lever at or near said heel, and a take-up composed of a semi-spheric nut movable in said take-up seat and a screw-bolt engaged by said nut and having a hock-end constructed with parallel sides to engage with the free end of the chain within said recess, substantially as hereinbefore specified.

3. In a chain pipe-wrench, the combination with the chain and a take-up of a hand-lever having biting devices at its heel, and provided at its toe with antifriction devices to engage with the pipe during the reverse strokes of the lever, substantially as hereinbefore specified.

4. In a chain pipe-wrench, the combination with the chain and a take-up of a hand-lever having biting-devices at its heel, a toe which engages the pipe during the reverse strokes of the lever, a concavity adjacent to said biting-devices for pipes of a given range of sizes, and a toe-extension tangential to said concavity to adapt the wrench to pipes of a second range of sizes, substantially as hereinbefore specified.

5. The combination, in a pipe-wrench, of a hand-lever having biting devices at its heel, a toe to engage the pipe during the reverse strokes of the lever, a take-up seat having a spheric concavity, and a longitudinal recess having parallel sides; a chain composed of edge-opposing flat links and transverse pintles, one end of which chain is fastened within said recess at or near said heel, while the pintles at its other end have projecting extremities; and a take-up composed of a semi-spheric nut, movable in said take-up seat, and a screw-bolt, engaged by said nut, and having a hook-end with parallel sides which engages said projecting extremities of the chain-pintles within such recess, substantially as hereinbefore specified.

J. H. NEWELL.

Witnesses:
J. S. WALL,
T. S. McKENZIE.